United States Patent [19]

Cornet et al.

[11] Patent Number: 4,586,165
[45] Date of Patent: Apr. 29, 1986

[54] THERMO-OPTIC INFORMATION WRITING PROCESS AND INFORMATION SUPPORT FOR IMPLEMENTING THIS PROCESS

[75] Inventors: Jean Cornet; Jean-Claude Lehureau; Henriette Magna, all of Paris, France

[73] Assignee: Thomson-CSF, Paris, France

[21] Appl. No.: 512,672

[22] Filed: Jul. 11, 1983

Related U.S. Application Data

[62] Division of Ser. No. 226,804, Jan. 21, 1981, Pat. No. 4,405,994.

[30] Foreign Application Priority Data

Jan. 23, 1980 [FR] France ................ 80 01425

[51] Int. Cl.⁴ .......................................... G11C 11/46
[52] U.S. Cl. ..................... 365/126; 369/127; 346/76 L; 430/348
[58] Field of Search ............ 365/120, 124, 126, 127; 369/100, 127, 130, 275, 283, 284, 288; 346/76 L, 135.1; 430/348

[56] References Cited

U.S. PATENT DOCUMENTS

| | | | |
|---|---|---|---|
| 4,004,080 | 1/1977 | Vossen et al. | 369/283 |
| 4,264,986 | 4/1981 | Willis | 365/127 |
| 4,285,056 | 8/1981 | Bell | 369/100 |
| 4,300,227 | 11/1981 | Bell | 369/100 |

FOREIGN PATENT DOCUMENTS

| | | |
|---|---|---|
| 2701218 | 5/1978 | Fed. Rep. of Germany . |
| 2111204 | 6/1972 | France . |
| 2145606 | 2/1973 | France . |
| 2214934 | 8/1974 | France . |
| 2404888 | 4/1979 | France . |
| 2026901 | 2/1980 | United Kingdom . |

OTHER PUBLICATIONS

Anderson, "Materials for Thermoplastic Recording by Heat Alone", IBM Tech. Disc. Bull., vol. 6, No. 12, 5/64, p. 3.
Katou, Abstract of Japan Patent 54-96002, 10/6/79.

Primary Examiner—Terrell W. Fears
Attorney, Agent, or Firm—Cushman, Darby & Cushman

[57] ABSTRACT

The invention relates to thermo-optic writing on an information support comprising a substrate on which there is deposited an organic sub-layer covered by a metal layer.

The invention provides a writing process which consists in creating in the metal layer a plastic deformation due to the thrust exerted by the localized swelling of the sub-layer. The writing produces a relief impression without piercing of said metal layer.

13 Claims, 6 Drawing Figures

THERMO-OPTIC INFORMATION WRITING PROCESS AND INFORMATION SUPPORT FOR IMPLEMENTING THIS PROCESS

This is a division of application Ser. No. 226,804, filed Jan. 21, 1981, now U.S. Pat. No. 4,405,994.

BACKGROUND OF THE INVENTION

The present invention relates to the writing on a support of elements of information capable of being read optically. It relates more particularly to a thermo-optic writing process and a thermo-sensitive support which allows the elements of information to be read immediately after recording thereof without it being necessary to provide a treatment such as chemical or heat development.

The use of a focused laser beam has been proposed as a writing means in combination with information support structures comprising generally thin-layer materials of a thickness between 30 and 100 nm. In known constructions, the surface energy density used to obtain for example the localized thermal ablation of a layer is relatively high. For the layer, semi-metals with a low melting point such as bismuth or tellurium have been proposed. However, experience shows that these semi-metals only give impressions with reproducible edges if the size of these impressions is sufficient, which greatly limits the storage capacity of the material. As for the surface energy density required for forming a permanent impression, it is normally greater than 80 $mJ.cm^{-2}$ so that low-power lasers cannot be envisaged when the flow of information is greater than a few M bits $s^{-1}$.

Besides semi-metals, there exist materials operating by thermal ablation such as vitreous chalcide alloys which have a lower thermal diffusivity and whose layers are more isotropic. These materials offer a greater sensitivity and allow impressions to be obtained by ablation having a more reproducible profile, even on the scale of 0.5 $\mu m$. However, here again, because of the thermal ablation process itself, the cup-shaped impressions are surrounded by a rim which is the cause of considerable noise which is superimposed on the reading signal.

Instead of using as information support a substrate having a single thermosensitive layer it has been contemplated covering a thermodegradable organic layer with a thin metal layer. In this case, the radiated writing energy is converted into heat energy by the metal layer and the heat thus created serves to produce a change of state localized in the thermodegradable layer. The products of decomposition create a gassy microbubble capable of piercing the metal layer and etching it. Here again, the impressions obtained have an uneven edge which does not lend itself to the storage of good-quality video signals.

SUMMARY OF THE INVENTION

The present invention provides a thermo-optic information writing process consisting in heating superficially by means of a focused radiation beam modulated in intensity a thermosensitive information support comprising a metal layer which covers an organic layer deposited on a substrate, characterized in that the heat energy released in the metal layer by impact of the beam causes local expansion without change of state of the organic layer; this expansion creating in the metal layer stretching situated beyond the elastic strength but short of the rupture elongation of the ductile material forming this metal layer.

The invention also provides an information support comprising a substrate on which there is deposited an organic layer coated with a metal layer, characterized in that the localized heating of the organic layer in the impact zone of a focused radiation beam causes by expansion without change of state plastic stretching of the metal layer; this stretching being situated beyond the elastic strength but short of the rupture elongation of the ductile material forming this metal layer.

DESCRIPTION OF THE DRAWINGS

The invention will be better understood from the following description and accompanying Figures in which.

DESCRIPTION OF THE PREFERRED EMBODIMENTS

Figure 1:
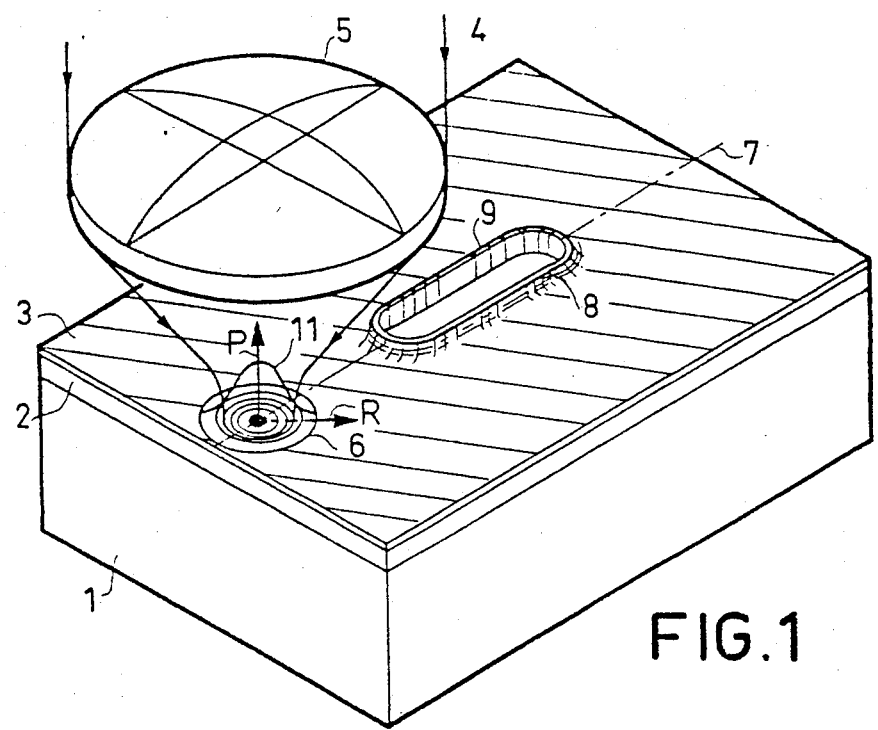
FIG. 1 shows a writing beam and the impression left on an information support when the power of the beam produces thermal ablation or localized piercing.

In FIG. 1 there can be seen an information support comprising a substrate 1 carrying an organic substance layer 2. Layer 2 is covered by a layer 3, for example a metal layer, which is subjected to thermal ablation so as to obtain a permanent impression 8 along an axis 7. The superficial thermal ablation is achieved in the embodiment shown by means of a radiated energy beam 4 which is focused at the surface of layer 3 by means of a lens 5. In the case of a form of revolution, the writing spot 6 supplies a power which decreases radially from the focusing point situated on the axis 7 of the track to be written. Profile 11 illustrates this incident power variation in the system with axis P, R where P designates the power and R the radius passing through the focusing point. Considering the incident power and the speed of translation of spot 6 along axis 7, localized heating of layer 3 and its neighbor 2 may be obtained such that there is thermal ablation by melting of layer 3. Layer 3 may also be subjected locally to piercing caused by the decomposition products of the sub-layer 2 when this latter is thermally degraded. By means of these thermal writing mechanisms, an impression 8 is obtained in the form of a cup more or less elongated with a rim 9 whose geometrical characteristics are not easily reproducible.

Figure 2:
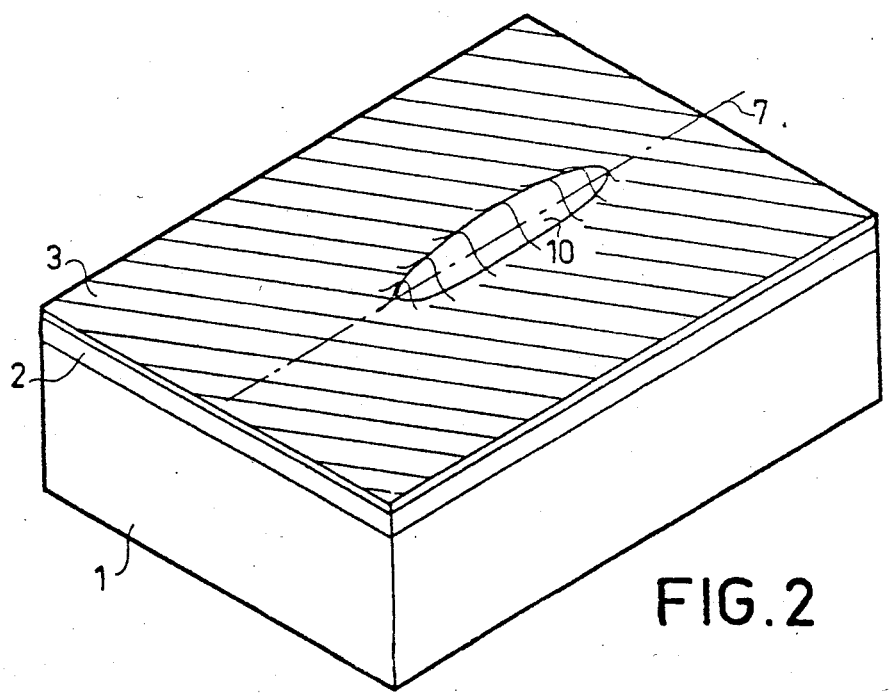
FIG. 2 shows the permanent impression obtained by the process of the invention.

In FIG. 2, an impression 10 can be seen which has neither rim nor tearing of layer 3. In accordance with the invention, the relief of impression 10 is maintained permanently after passage of the light pulse, for it results from a plastic deformation of layer 3 caused by the transitory thermal expansion of sub-layer 2. To this end, support 1 has a sub-layer 2 of a thermodeformable organic material having a thickness of the order of 50 to 300 nm and this sub-layer 2 is covered with a fine metal layer 3 having a thickness of the order of 5 to 10 nm. Support 1 may be of any kind, metal, vitreous or organic, opaque or transparent, flexible or rigid, and also of any thickness. By way of nonlimiting example, support 1 is a transparent and rigid support of a thickness from 1 to 2 mm.

The sub-layer 2 is preferably chosen highly thermally expansible, but the material used must undergo no appreciable degradation or decomposition during the thermal writing process.

Metal layer 3 fulfills several functions. It serves for converting the incident radiation into thermal energy, which implies that it absorbs the writing radiation. This layer must furthermore take on the exact form of the transitory thermal swelling of sub-layer 2. To this end, it is made from a ductile material so as to be the seat of plastic deformation during the recording process. Finally, the rupture elongation of the material forming layer 3 must be sufficiently high for this latter to maintain its integrity during the transitory thermal swelling of sub-layer 2. Since the thermal writing process results neither in piercing layer 3 nor in the formation of a rim about the impression, a good signal-to-noise ratio is obtained during reading. Furthermore, the absence of a change of state allows good writing to be obtained with a surface energy density of 20 to 40 mJ.cm$^{-2}$.

Figure 3:
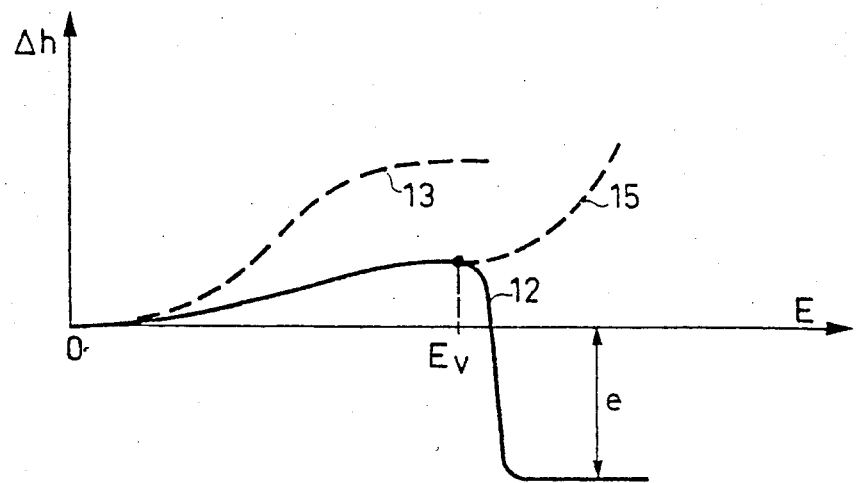
FIGS. 3 and 4 are explanatory diagrams.

FIG. 3 is an experimental record showing as a function of the surface energy density E the development of the amplitude $\Delta$ h of the relief which can be obtained with an information support such as that shown in FIG. 1. Curve 12 shows that the relief of the impression assumes an increasing amplitude under transitory conditions until an energy density $E_V$ is reached above which a change of state can be observed which reveals itself by ablation or piercing of the metal layer. The continuous line branch of curve 12 situated to the right of abscissa $E_V$ indicates that layer 3 has undergone ablation; this results in a negative relief of amplitude e. In another configuration, swelling may be observed which finishes by piercing of layer 3; this case is illustrated by the broken line branch 15.

In accordance with the invention, the impression is obtained with an energy density less than $E_V$, so that neither layer 3 nor sub-layer 2 undergo a change of state. So as to obtain under these conditions a permanent impression, plastic deformation of layer 3 is provided, which is induced by a considerable transitory thermal expansion of sub-layer 2. By way of example, curve 13 illustrates the transitory expansion obtained by adding a plasticizer to the organic material of sub-layer 2. The plasticizer modifies the thermal and mechanical properties of the polymer with which it is incorporated. The introduction of the plasticizer reduces the density of the polymer, lowers its softening point, its viscosity at a given temperature, its elastic strength and its hardness. Furthermore, the plasticizer substantially increases the coefficient of thermal expansion and the rupture elongation.

Figure 4:
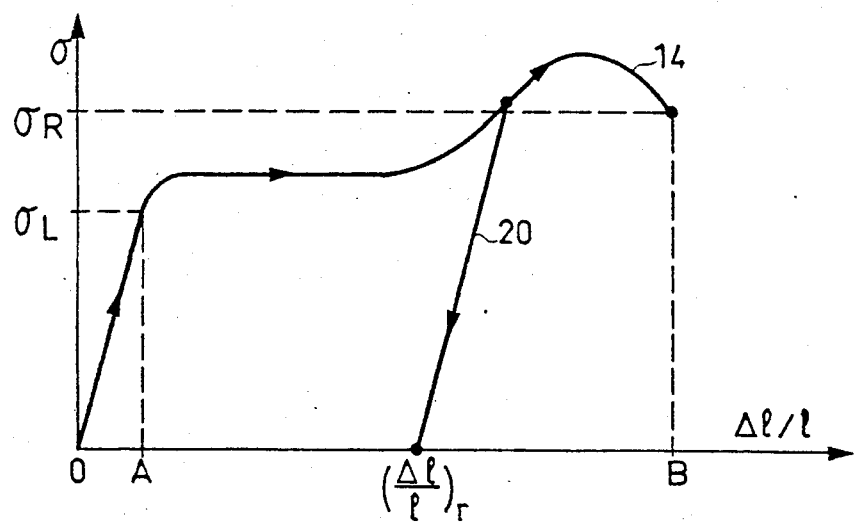

FIG. 4 shows the mode of action of layer 3 in the writing process. The diagram represents the relative elongation $\Delta l/l$ as a function of the mechanical tension $\sigma$ created in layer 3 by localized swelling of sub-layer 2. For a relative elongation between 0 and A, layer 3 is deformed elastically as the linear portion of the load curve 14 shows and this deformation is reversible. As soon as the elastic limit $\sigma_L$ is exceeded, a high relative elongation may be seen in a plastic deformation zone which comprises a practically horizontal section followed by a rounded section where the material reaches the rupture loading. After passage of the heat wave, relaxation of sub-layer 2 leaves behind a permanent elongation $(\Delta l/l)r$ which is obtained by plotting unloading line 20. For a more intense heat wave, layer 3 may be caused to reach rupture elongation OB. The plastic elongation zone which extends between points A and B is that in which layer 3 is greatly stretched with a striction effect which causes it finally to break for a tension $\sigma_R$ less than the rupture loading. In fact, it is the differential expansion coefficient between sub-layer 2 and metal layer 3 which determines the magnitude of the plastic deformation resulting from the thermal writing. By using a highly plasticized sub-layer 2, it is not rare for the differential expansion coefficient to be as high as $10^{-4}K^{-1}$. The rise in temperature of metal layer 3 subjected to a laser beam of a diameter equal to a micron and of a power equal to a few milliwatts may reach a few hundred degrees Kelvin after 50 ns. The result is that the surface expansion due to swelling of sub-layer 2 may reach 4%. About 0.2% of this expansion may be elastically re-absorbed after passage of the heat wave. The deformation residue in the sub-layer has then produced plastic deformation creating the permanent relief of FIG. 2. The height of this relief may easily reach 200 nm. By increasing the power of the writing beam, there may be degradation of the plasticizer then that of the polymer. The result would be the formation of a gas bubble with, after a certain time, piercing of layer 3. This eventually is outside the scope of the present invention.

The plastic deformation writing process in accordance with the invention is applicable to practically all the thermoplastic polymers non-degradable at low temperature. The choice of the organic substances for forming sub-layer 2 takes into consideration the ease of depositing in a thin or semi-thick layer over large areas, the microscopic quality of the layer (continuity, absence of granulation or other defects), its transparency and its adhesion to substrate 1.

By way of nonlimiting examples, for the sub-layer the following may be used: methyl polymethacrylate, polystyrene, the polycarbonates, polyurethanes, the derivatives of cellulose (nitrocellulose, cellulose acetate, ethylcellulose, cellulose acetobutyrate); these substances may be formed as a solution and deposited after plasticization on the chosen substrate. As solvents, simple solvents with a high vapor tension may be used such as: acetone, cyclohexanone or the solvent mixture defined under the name "AZ Thinner" by the firm SHIPLEY. The coating of sub-layer 2 may take place by printing or by centrifugation. Other methods for depositing sub-layer 2 may also be used, such as vacuum sublimation and cathode sputtering.

As far as the additives used for plasticizing the base polymers are concerned, the saturated linear diesters may be mentioned such as isodecyl, butoxyethyl or ethylhexyl adipates, azelates and sebacates. The cyclic diesters such as isodecyl, cyclohexyl or ethylhexyl phthalates may also be considered. All these plasticizers may be incorporated with the base polymers in amounts going up to 75%.

For forming layer 3, the metals are chosen depending on their ductility and on their capability of forming thin layers free of stresses. In fact, although the elongations undergone by metal layer 3 do not exceed a few percent, the speed at which the deformation occurs involves the use of a shock-resisting layer having a static ductility of at least 40%. The existence of stresses in the metal layer may adversely affect good conservation of the written data, for such stresses would lead after a more or less long period of time to relaxation in the plasticized polymer.

In practice, layer 3 should be deposited at a slow speed ($2.10^{-2}$ to $10^{-1}$ nm.s$^{-1}$). The thickness of the deposit is preferably less than or equal to 10 nm. Low hardness and good resistance to oxidization are also desirable. Even slight oxidization may sufficiently harden the metal layer to induce stresses therein. On the other hand, oxidization introduces a risk of nonhomogeneity since it influences the absorbing power of the metal layer.

Taking the above into account, the choice may be preferably made of gold, silver and platinum. Alloys of these metals may also be used to the extent that these alloys are in homogeneous phase and have low hardness, which is the case with Au-Ag alloys. So as to reduce the cost price for depositing layer 3, there may also be alloyed with gold, silver or platinum any one or a group of the following elements: zinc, bismuth, nickel, copper and germanium to the extent that the percentage of precious metal remains greater than or equal to 60% by weight so as to conserve excellent resistance to oxidization and to retain in the homogeneous phase high ductility and low hardness. Thus the Au-Ag-Cu alloys used in the jewelry trade may be used. Furthermore, the Applicant has obtained excellent results with Au-Cu alloys in proportions by mass of copper up to 40% in particular for the $Cu_{20}Au_{80}$ composition. All these metals allow thin layers to be obtained having an absorbing power close to 50% for the incident radiation when the thickness of the layers is between 4 and 10 nm.

It was seen with reference to FIG. 4 that before reaching the rupture loading, the mechanical tension $\sigma$ undergoes an increase which in fact marks a reduction in thickness. This effect, preceptible over the whole extent of the plastic deformation zone may be used for reading the impression by the local reduction of reflectance and by the corelative increase of transmittance of the metal layer. We then have an amplitude contrast which completes the phase contrast connected with the relief of the impression.

The fineness of layer 3 and the low mechanical strength of plasticized sub-layer 2 make the information support vulnerable to handling so that it may be advisable to protect the sensitive elements of the information support by means of a cover.

Figure 5:
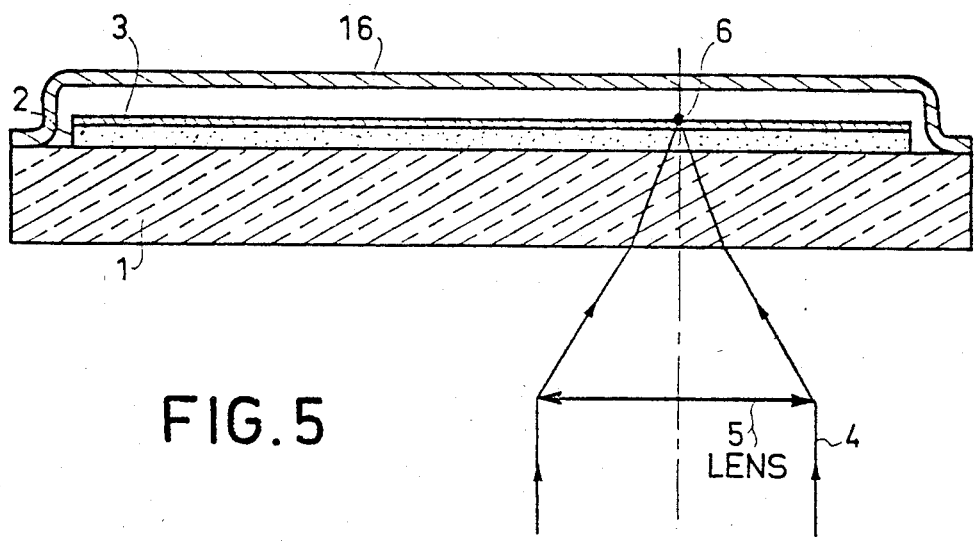
FIG. 5 is a sectional view of an information support in accordance with the invention.

In FIG. 5, an information support may be seen made from a transparent support 1. Sub-layer 2 and layer 3 are protected by a cover 16 which provides an empty space above layer 3. Writing may be achieved by means of a beam 4 which passes through substrate 1 and is focused on layer 3 by a lens 5.

Figure 6:
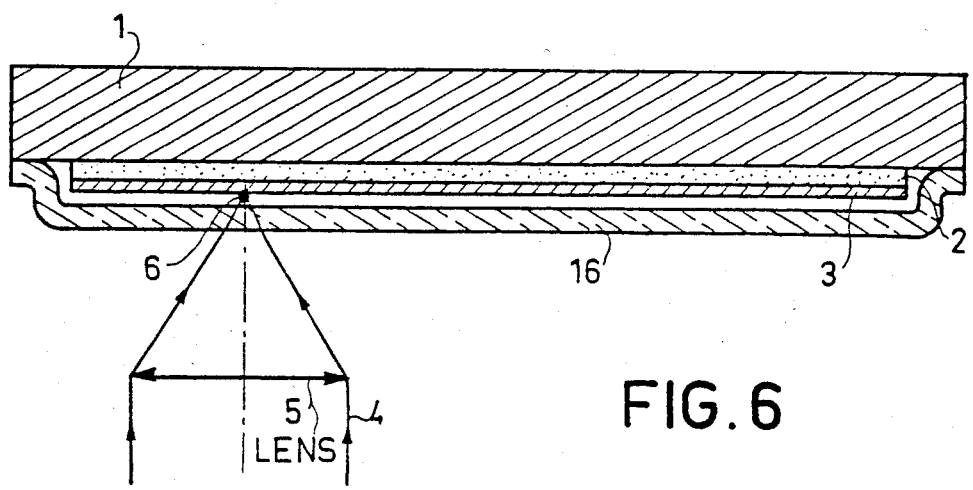
FIG. 6 is a sectional view of another embodiment of the information support in accordance with the invention.

In FIG. 6, another embodiment of the information support of FIG. 5 may be seen. The protecting cover 16 is here permeable to the writing radiation and substrate 1 may be opaque if reading is effected by reflection. For reading by transmission, the two elements giving access to layer 3 must be permeable to the reading radiation.

A typical embodiment of an information support in accordance with the invention might have the following characteristics: substrate 1 is formed from a disk of methyl polymethacrylate 356 mm in diameter and 1.5 mm in thickness. This substrate is covered with a sub-layer 3 of nitrocellulose having a thickness of 100 nm. This sub-layer 2 is deposited from a solution of 8 g of nitrocellulose in a liter of "AZ Thinner" containing 3% of Di (2-ethyl-hexyl) phthalate plasticizer. The layer is subjected to centrifugation at the speed of 6 revolutions.s$^{-1}$. After complete evaporation of the solvent at ordinary temperature, sub-layer 2 is covered with a gold layer 3 of 7 nm by evaporation in a vacuum at the rate of $5.10^{-2}$ nm.s$^{-1}$. Writing on the recording support is effected through the substrate with a beam coming from a helium neon laser ($\lambda = 633$ nm) modulated at the frequency of 10 MHz. The projection lens used has an aperture of 0.45. With the disk driven at the rate of 25 revolutions.s$^{-1}$ and the writing effected with a radius of 130 mm, we have a succession of impressions 0.7 $\mu$m wide with a relief 150 nm high. The impressions have a length along the writing axis equal to 1 $\mu$m and are spaced 1 $\mu$m apart for an incident power of 5 mW. With such a recorded support, the reading signal measured at the spectral analyzer and referred to the optical noise is located at a 60 dB level for a frequency band of 30 kHz. This support is then quite appropriate for storing good quality video signals.

The thermo-optic writing process which has just been described lends itself to overimpression, for it is possible to carry out several deformations of increasing values in the plastic deformation range AB. In particular, it is possible to create on the surface of the information support a blank track for example in spiral shape and on this continuous relief to rewrite data in the form of a succession of isolated impressions which accentuate the prerecorded relief. It is also possible to assign more than two signal values to the recorded information particularly by operating on the phase contrast and/or on the amplitude contrast.

Although there has been described in what has gone before and shown in the drawings the essential characteristics of the present invention applied to preferred embodiments thereof, it is obvious that a man skilled in the art may make any modification of form or detail thereto which he thinks useful without departing from the scope and spirit of the invention.

What is claimed is:

1. In a thermo-optic information writing process consisting in heating superficially in a first writing phase by means of a focused radiation beam modulated in intensity a thermosensitive information support comprising a metal layer which covers an organic layer deposited on a substrate, the heat energy released in the metal layer by impact of the beam causes local expansion without change of state of the organic layer; this expansion creating a first relief in the metal layer by stretching situated beyond the elastic limit and short of the rupture elongation of the ductile material forming said metal layer and heating superficially in a second writing phase to modify said first relief locally by a second relief more accentuated than said first relief.

2. The process as claimed in claim 1, wherein said organic layer is made from at least one basic polymer material in which there has been incorporated at least one plasticizing substance for increasing the thermal expansion coefficient.

3. The process as claimed in claim 1, wherein said organic layer is deposited from a solution prepared by means of a solvent; the solvent being completely evaporated before depositing said metal layer.

4. The process as claimed in claim 1, wherein said organic and metal layers are protected by a cover fixed to the information support.

5. An information support for recording information comprising:

a substrate of organic material thermally expanded at a plurality of discrete locations on the surface thereof without change of state and in response to localized heating produced by a focused radiation beam, said localized heating producing deformation and a ductile metal layer deposited on said surface of said substrate and permanently deformed at said locations in response to the thermal expansion of said thermally expanded organic material to form a permanent relief, recording said information, said organic material remaining solid when thermally expanded to totally fill said deformations, the localized heating of said organic substrate in the impact zone of said beam generating expansion without change of state for causing plastic stretching of said metal layer, said plastic stretching being situated beyond the elastic limit but short of the rupture elongation of said ductile metal layer.

6. The information support as claimed in claim 5, wherein said organic layer is formed by at least one basic polymer in which is incorporated an additive having plasticizing properties.

7. The information support as claimed in claim 6, wherein said basic polymer is a cellulose derivative.

8. The information support as claimed in claim 6, wherein said basic polymer belongs to the group comprising the polymethacrylates, the polycarbonates, polystyrene and the polyurethanes.

9. The information support as claimed in claim 6, wherein said additive is a diester of phthalate, adipate, azelate or sebacate type.

10. The information support as claimed in claim 5, wherein said metal layer is made from a precious metal gold, silver or platinum, from an alloy of these precious metals or from an alloy of these precious metals containing at least one of the metals: nickel, zinc, bismuth, copper, germanium.

11. The information support as claimed in claim 5, wherein said metal layer is provided with a prerecorded track.

12. The information support as claimed in claim 5, wherein said metal layer is protected by a cover projecting over the information support.

13. The information support as claimed in claim 10, wherein said metal layer is a $Cu_{20}Au_{80}$ alloy.

* * * * *